United States Patent [19]

Sword et al.

[11] 3,944,739

[45] Mar. 16, 1976

[54] ELECTRO-OPTICAL SYSTEMS

[75] Inventors: Geoffrey Sword; John Leslie Lawrence; Stephen Richard Raggett, all of Fareham; Bernard Blakemore, London, all of England

[73] Assignee: Colourvision Associates, London, England

[22] Filed: Feb. 8, 1974

[21] Appl. No.: 440,702

[30] Foreign Application Priority Data
Feb. 9, 1973   United Kingdom................. 6425/73

[52] U.S. Cl. ........... 178/7.85; 358/54; 178/DIG. 28
[51] Int. Cl.[2] ......................................... H01J 29/89
[58] Field of Search ..... 178/7.85, 7.1, 7.2, DIG. 28, 178/DIG. 27, 7.6; 358/54; 250/216; 350/190

[56]   References Cited
UNITED STATES PATENTS
3,651,254   3/1972   Metzger...................... 178/DIG. 28

Primary Examiner—Robert L. Griffin
Assistant Examiner—Jin F. Ng
Attorney, Agent, or Firm—Robert F. O'Connell

[57]   ABSTRACT

This invention relates to an electro-optical system having a red reflecting dichroic mirror arranged to reflect red light to a first photomultiplier through a red-transmitting filter, and to transmit blue and green light to a blue reflecting dichroic mirror arranged to reflect blue light received thereby from the red reflecting dichroic mirror to a second photomultiplier through a series combination of a low pass blue transmitting filter and a high pass blue transmitting filter and to transmit green light. A third photomultiplier being arranged to receive through a green transmitting filter green light received by the blue reflecting dichroic mirror from the red reflecting dichroic mirror. The photomultipliers produce electrical signals representative of the intensity of the light incident on their photocathodes.

The electro-optical system includes a cathode ray tube and lens for scanning an image bearing medium with a spot of light over a limited region, and three plano-cylindrical lenses for producing respective distributions of light over the photocathodes of the photomultipliers. This optical arrangement produces substantially the same distribution of light of the said photosensitive area for all positions of the spot of light in the said limited region.

2 Claims, 7 Drawing Figures

ELECTRO-OPTICAL SYSTEMS

BACKGROUND OF THE INVENTION

This invention relates to electro-optical systems, and particularly to electro-optical systems for flying spot television scanner apparatus.

A flying spot television scanner apparatus typically comprises a film transport mechanism including a driven take-up spool and a driven intermittent drive mechanism. Electric motors are provided for driving the take-up spool and the intermittent drive mechanism, and these motors are so controlled as to ensure that a film passes through a film gate in the transport mechanism at a rate of film frames per second which preserves the illusion of natural motion on the film and also enables each frame of the film to be scanned by two or more television scanning fields while ensuring that pull-down of the film between successive frames presented for scanning in the gate occurs only during a field blanking pulse of the television scanning. The scanning is accomplished by a point of light carrying out a television field scan on the picture area of a film frame in the gate. This point of light is produced by a cathode ray tude combined in the flying spot scanner apparatus with an optical system arranged to project an image of a faster area of the screen of the cathode ray tube onto the picture area in the gate. The cathode ray tube is coupled to television scanning and blanking circuits which in operation produce a television raster on the raster area of the tube screen.

For color television, the light from the scanned film must be separated into red, green, and blue components centered on predetermined wavelengths prescribed by standards accepted for color television.

This separation is, in known flying spot scanners, typically achieved by the use of two dichroic mirrors and a respective trimming filter for each separated color. Such an arrangement is described at pages 139 to 143 of "Principles of PAL Color Television and Related Systems" by H. V. Sims, 1969, published by Iliffe Books, Butterworth & Co. (Publishers) Ltd., London. The separated light is sensed by three photomultipliers, one for the red light, one for the green, and one for the blue.

SUMMARY OF THE INVENTION

According to one aspect of the present invention there is provided an electro-optical system including a red-reflecting dichroic mirror arranged to reflect red light to a first photosensitive electrooptical device through a red-transmitting filter, and to transmit blue and green light to a blue-reflecting dichroic mirror. The blue-reflecting dichroic mirror is arranged to reflect blue light received thereby from the red-reflecting dichroic mirror to a second photosensitive device through a series combination of a low pass blue-transmitting filter and a high pass blue-transmitting filter and to transmit green light. A third photosensitive electro-optical device is arranged to receive through a green-transmitting filter green light received by the blue-reflecting dichroic mirror from the red-reflecting dichroic mirror. The three photosensitive electro-optical devices produce, in operation when receiving light transmitted thereto by the respective filter or filters, electrical signals representative of the intensity of the light incident thereon. Each photosensitive device may be a photomultiplier having a suitable photocathode arranged to receive the light incident upon the device from the respective filter or filters.

According to another aspect of the present invention there is provided an electro-optical system including means for scanning an image-bearing medium with a spot of light over a limited region, and an optical arrangement for producing a distribution of light over a photosensitive area of an electro-optical light sensing device. The optical arrangement produces substantially the same distribution of light of the said photosensitive area for all positions of the spot of light in the said limited region. Where the said limited region is rectangular and the said photosensitive area is rectangular, the optical arrangement can be in the form of a single plano-cylindrical lens having the axis of its cylindrical surface lying parallel to respective sides of the said region and the said area. The said area may be the usable area of a larger photosensitive area.

A preferred embodiment of the present invention will now be described with reference to the accompanying drawings.

DETAILED DESCRIPTION OF THE PREFERRED EMBODIMENTS

Figure 7:
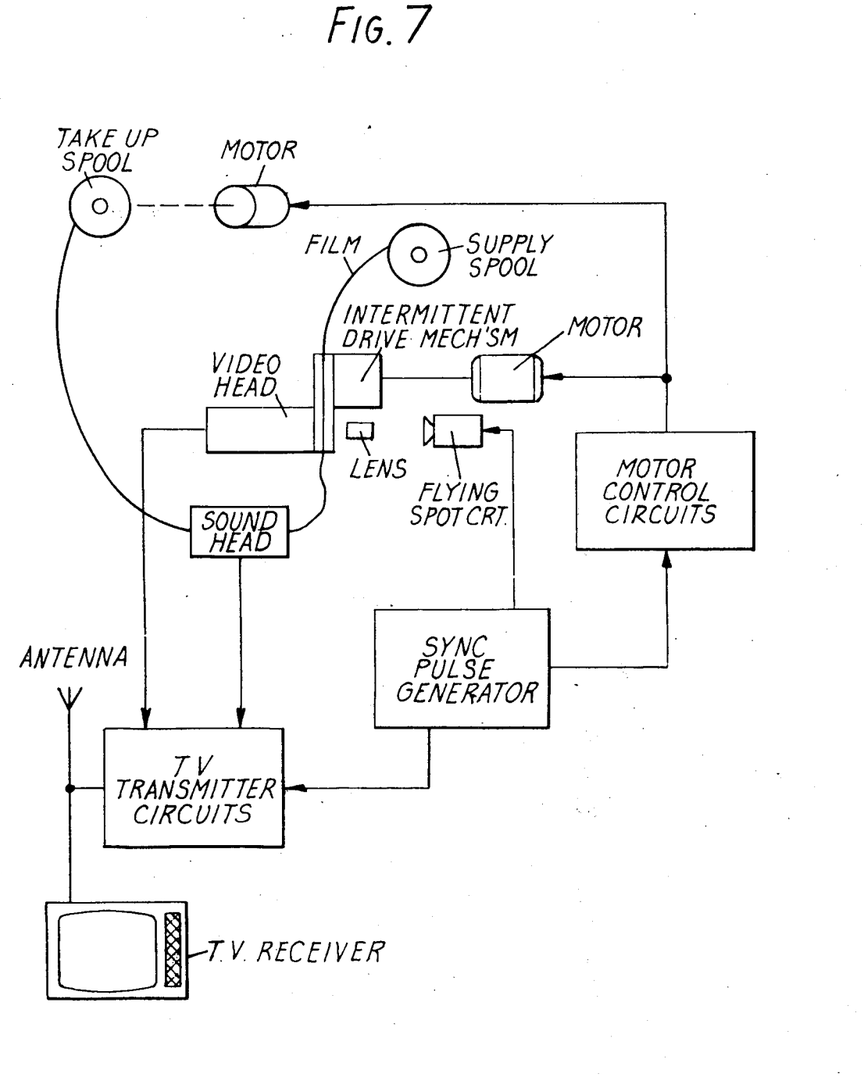
FIG. 7 is a block diagram of a flying spot scanner television system incorporating the electro-optical system of FIGS. 1 and 2.

A novel flying spot television scanner apparatus embodying the present invention will not be described with reference to FIG. 7 of the accompanying drawings. In FIG. 7 there is shown a television transmitter apparatus coupled by a transmission line such as a coaxial cable to an antenna and a television receiver. Where the transmitter apparatus is intended to broadcast a programme via the antenna, the coupled receiver may be a transmission monitoring receiver. Alternatively, the apparatus of FIG. 7 may be intended primarily as a cable television system, the transmission antenna being disconnected or replaced by a receiving antenna for the individual receiver and the receiving antenna may be disconnected when the receiver is being supplied by the transmitter apparatus, or may remain connected if there is on risk of interference from signals in the channel of frequencies transmitted by the transmitter apparatus.

The transmitter apparatus includes a flying spot receiver with a film transport mechanism including a driven take-up spool and a driven intermittent drive mechanism of the invention. A first d.c. electric motor controlled by motor control circuits is coupled through, for example, conventional reduction gearing to drive the take-up spool, and a second d.c. electric motor controlled by the motor control circuits is coupled through, for example, conventional reduction gearing to drive the intermittent drive mechanism of the invention. The film transport mechanism also includes a film gate through which film from a supply spool is drawn by the intermittent drive mechanism to pass before a video head and through a sound head before winding on to the take-up spool. Conventional mechanical details of the film transport which will be obvious to those skilled in the art will, for clarity, not be described herein. The motor control circuits are preferably as described and claimed in the co-pending application entitled "Control Apparatus for Electric Motors" by Geoffrey Sword, John L. Lawrence, Stephen R. Raggett and Bernard Blakemore, and filed on the same day as the present application. The intermittent drive mechanism may be as described and claimed in the co-pending application, Ser. No. 440,761, entitled "Mechanisms for Transporting Perforated Strip Material" by John T. Taylor, Anthony J. Halliday, Jonathan G. C. Angel, and Bernard Blakemore, and filed on the same day as the present application.

The scanner includes a flying spot cathode ray tube controlled by a synchronizing pulse generator. Such arrangements are described in "The Focal Encyclopedia of Film & Television Techniques" published in 1969 by The Focal Press, London and New York, at pages 817 to 845. Synchronizing pulse generators are described in the aforesaid Focal Encyclopedia at page 811.

In operation a television field raster is produced on the screen of the cathode ray tube, and the light from the scanning spot constituting this raster is focussed by a lens or lens system to form an image of the raster on a picture area of a frame of the film in the film gate. The novel video head of this invention is a color television video head incorporating a photomultiplier for each of three colors and suitable optical elements for color separation and for focussing light from the illuminated picture on to respective sensitive areas of the photomultipliers, thereby producing in operation a video signal which is supplied by the video head to the composite video signal-forming portion of television transmitter circuits, the output of the synchronizing pulse generator likewise being supplied thereto in known manner for the production in the transmitter circuits of a composite video signal. Where the color system is the NTSC system, the transmitter circuits and synchronizing pulse generator may be as described in "Principles of Color Television" by The Hazeltine Laboratories Staff, published in 1956 by John Wiley & Sons, Inc., Library of Congress Catalogue Card Number 56-8693. Where the color system is the PAL system, the transmitter circuits and synchronizing pulse generator may be as described in "PAL Color Television" by G. Boris Townsend, published by the Syndics of the Cambridge University Press, London.

Figure 1:
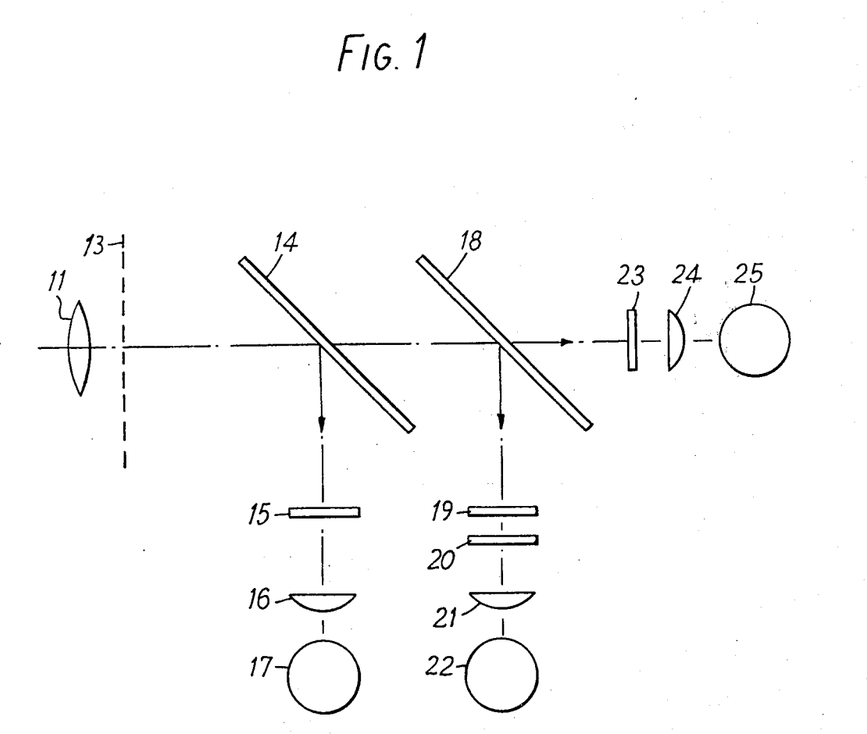
FIG. 1 is a schematic view of part of an electro-optical system of a flying spot scanner for use with color film and embodying the invention.
Figure 2:
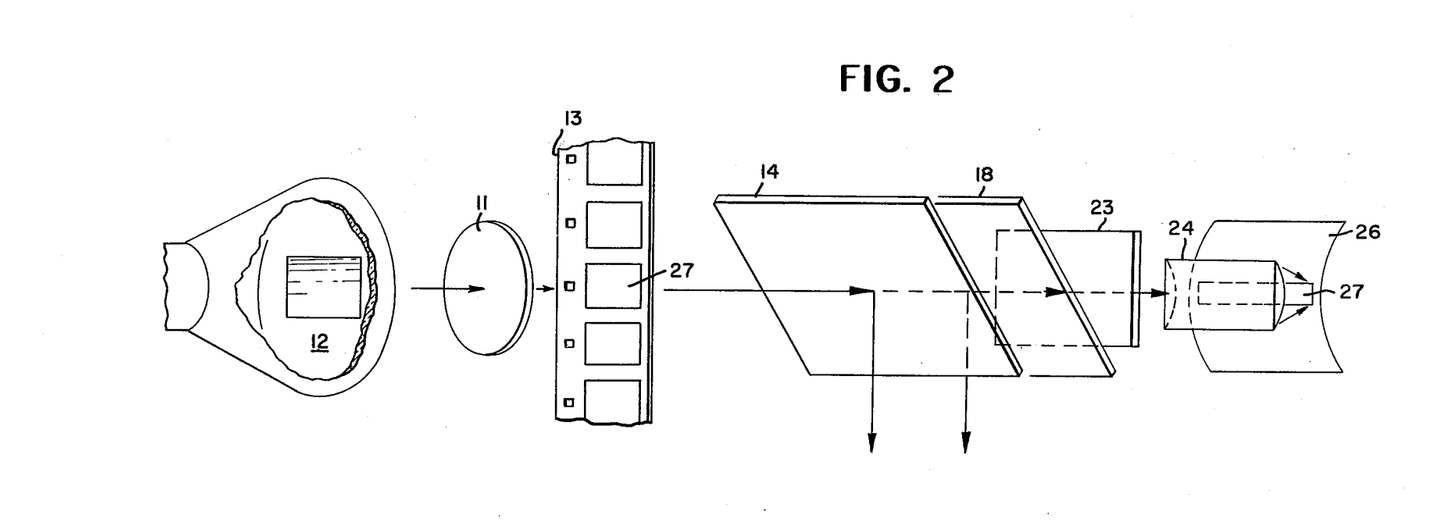
FIG. 2 is a simplified perspective view of part of the electrooptical system of FIG. 1.

In FIG. 1 there is shown schematically part of an electro-optical system of the flying spot scanner in which an objective lens 11 forms an image of a spot of light on a cathode ray tube screen 12, shown in FIG. 2, on a frame of a film 13 which is transported through the scanner in operation. Since the film will normally be a color film, the remainder of the electro-optical system is constructed to resolve light transmitted through the film 13 into three components which are respectively red, blue and green. Light transmitted through the film 13 falls first on a red-reflecting dichroic mirror 14 which reflects the red component of the light incident thereon to a red filter 15. Light which is transmitted by the red filter 15 falls on a plano-cylindrical lens 16 having the axis of its cylindrical surface parallel to the width of the film 13 and to the longitudinal axis of the photo-cathode (not shown) of a photomultiplier 17.

Light which is transmitted by the red dichroic mirror 14 from the film 13 is incident upon a blue-reflecting dichroic mirror 18 which reflects the blue component of the light incident thereon to a low pass blue filter 19. Light transmitted through the low pass blue filter 19 from the mirror 18 is incident upon a high pass blue filter 20. The blue filters 19 and 20 define a band of wavelengths in the blue region of the spectrum which is allowed in the system of FIG. 1 to reach a plano-cylindrical lens 21 and thence the photocathode (not shown) of a photomultiplier 22 from the film 13.

The axis of the cylindrical surface of the lens 21 is parallel to the width of the film 13 and to the longitudinal axis of the photocathode of the photomultiplier 22.

Light from the film 13 which passes through the blue dichroic mirror 18 is incident upon a green filter 23. Light which is transmitted by the filter 23 from the film 13 is incident upon a plano-cylindrical lens 24 having the axis of its cylindrical surface parallel to the width of the film 13 and to the longitudinal axis of the photocathode 26 (FIG. 2) of a photomultiplier 25.

In operation, a television scanning raster is produced on the screen 12 by the electron beam of the cathode ray tube, as indicated in FIG. 2. Thus the spot of light on the screen 12 traces out a rectangular array of scanning lines to form the raster. The lens 11 is arranged to form on a frame 27 of the film 13 held in the gate of the film transport mechanism, described in the aforesaid co-pending application entitled "Mechanisms for Transporting Perforated Strip Material," an image of the raster traced out on the screen 12. Thus each point in the frame 27 is illuminated in turn by light from the screen 12 and transmits a portion of that light, attenuated and filtered according to the optical density and color of the film at the respective point of the frame 27, to the mirror 14.

The mirror 14 is arranged to reflect red light incident thereon from the frame 27 into a direction substantially parallel to the height of the frame 27. Similarly, the mirror 18 is arranged to reflect blue light incident thereon from the mirror 14 into a direction substantially parallel to the height of the frame 27.

Figure 3:
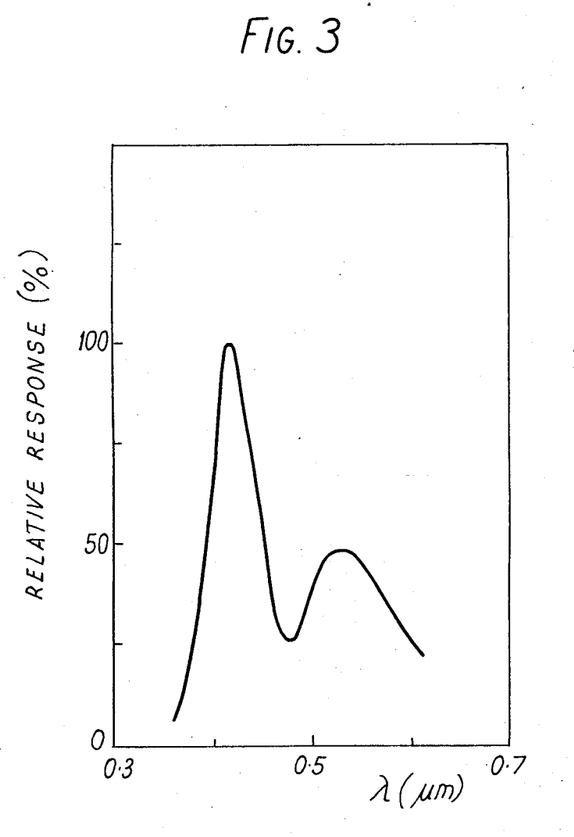
FIG. 3 is a graphical representation of the percentage relative response of a cathode ray tube phosphor or stimulation by an electron beam.

FIG. 3 shows that the phosphor of a known cathode ray tube screen, type GU by Mullard Limited, England, has a high peak energy emission at substantially 4150 Angstrom units, taken as 100 percent, and a lower peak of substantially 48 percent at substantially 5300 Angstrom units, there being a minimum of substantially 26 percent at substantially 4750 Angstrom units. The response at the red end of the spectrum diminishes, reaching substantially 23 percent at 6100 Angstrom units.

Figure 4:
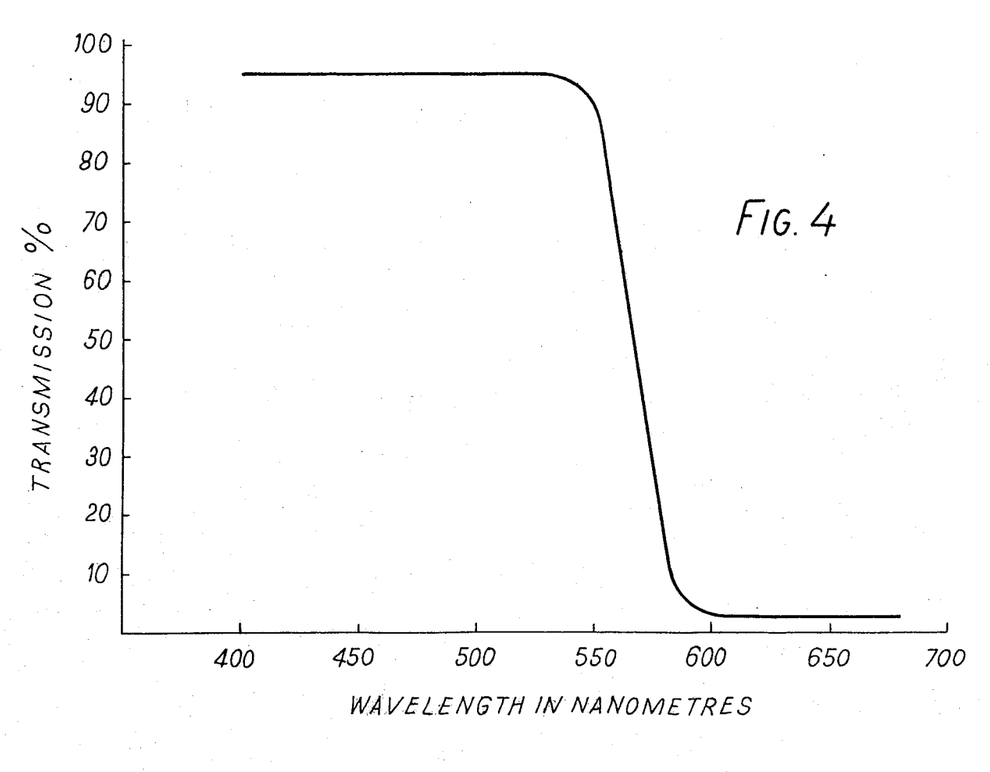
FIG. 4 is a graphical representation of the variation of the percentage of light transmitted with wavelength by a dichroic mirror which reflects red light.

FIG. 4 shows the percentage of incident light transmitted by the red-reflecting mirror 14 as a function of wavelength. Substantially 97 percent of incident light having a wavelength at or above 6000 Angstrom units is reflected by the mirror 14. From FIG. 6 it can be seen that the red filter 15 transmits substantially 97 percent of the light incident thereon having a wavelength at or above substantially 6150 Angstrom units, the percentage transmission as a function of wavelength for the filter 15 being indicated by the legend RED SHAPING FILTER on FIG. 6, and the point of 50 percent transmission being indicated by a cross. The filter 15 absorbs substantially 97 percent of light at or below 5650 Angstrom units. At and below 5250 Angstrom units the mirror 14 transmits substantially 95 percent of the incident light.

Figure 5:
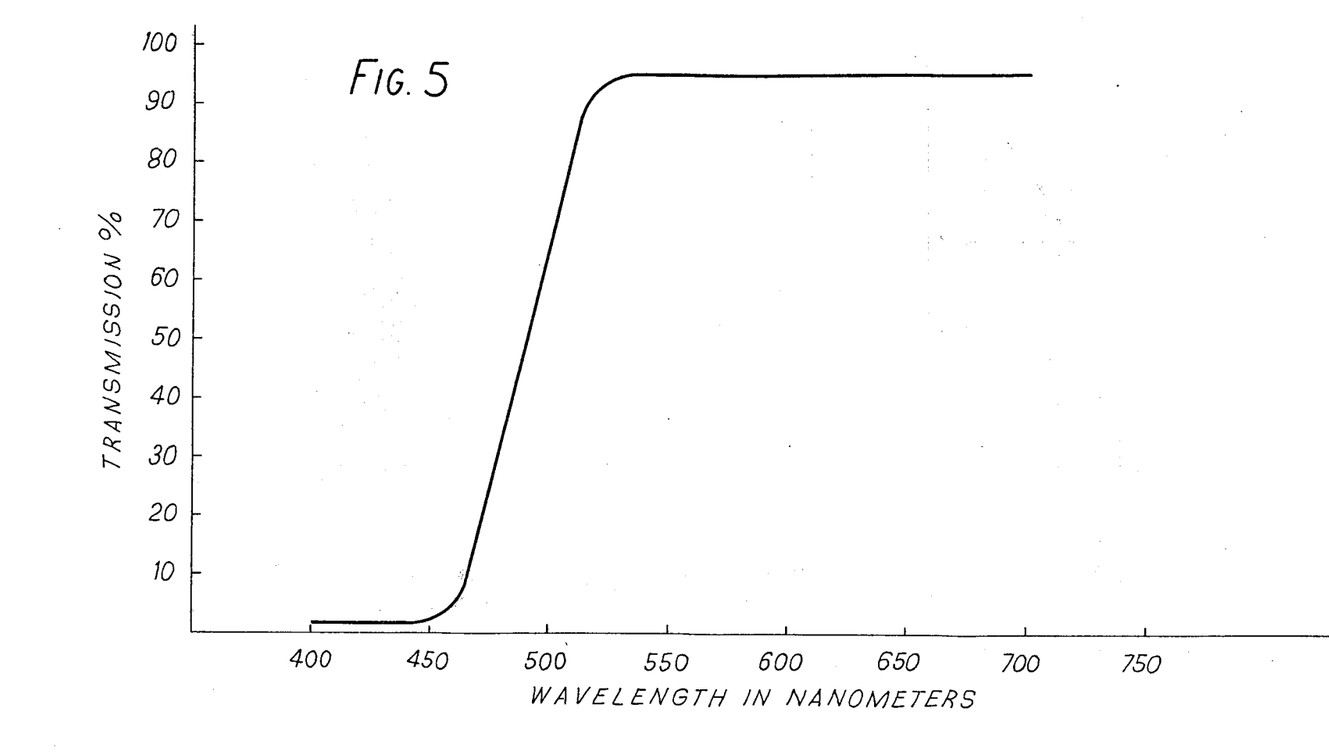
FIG. 5 is a graphical representation of the variation of the percentage of light transmitted with wavelength by a dichroic mirror which reflects blue light.

FIG. 5 shows that the blue-reflecting mirror 18 transmits substantially 95 percent of incident light at and above 5350 Angstrom units, and reflects substantially 98 percent of light at and below 4400 Angstrom units. The low pass blue filter 19 transmits substantially 95 percent of light at and above 4650 Angstrom units, and absorbs substantially 97 percent of light at and below 4000 Angstrom units. Hence the light incident upon the high pass blue filter 20 contains wavelengths confined substantially to a range of 4000 to 5250 Angstrom units. The high pass blue filter absorbs substantially 97 percent of the incident light at or above 5000 Angstrom units, and transmits substantially 95 percent of light at or below 4400. The 50 percent transmission points of the filters 19 and 20 are respectively 4700 and 4300 Angstrom units, and each of the filters transmits substantially 93 percent at 4500 Angstrom units. As a result of these characteristics and that of the mirror 14, at least 70 percent of light in the range 4450 to 4550 Angstrom units from the film 13 reaches the photomultiplier 17 with a peak of substantially 86.5 percent at 4500 Angstrom units.

Figure 6:
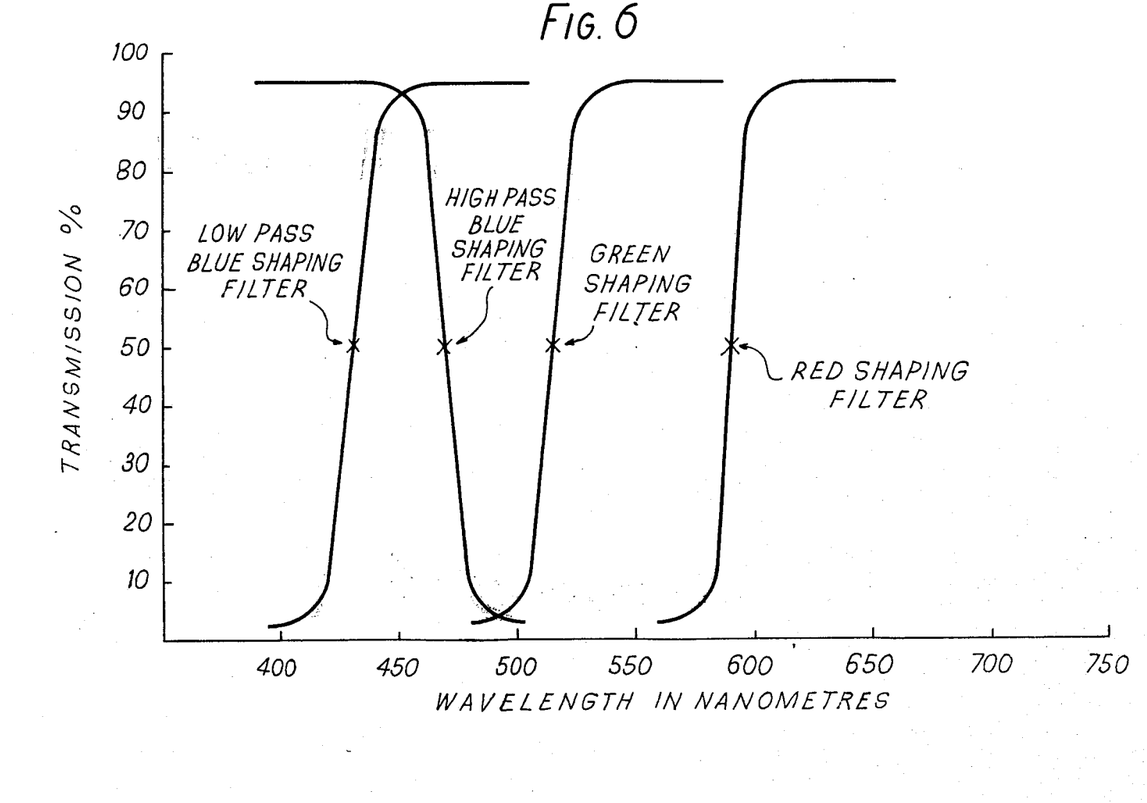
FIG. 6 is a graphical representation of the variation of the percentage of light transmitted with wavelength by four different filters.

The blue-reflecting mirror 18 has incident upon it light of wavelengths at and below 6000 Angstrom units, and therefore the light incident upon the green filter 23 lies in a range of substantially 4400 to 6000 Angstrom units, and mainly within a range of substantially 4650 to 5650 Angstrom units defined by the 50 percent transmission points of the mirrors 14 and 18, a peak of substantially 90 percent transmission being provided by the combination of the mirrors 14 and 18 at substantially 5250 Angstrom units. The green filter 23, as indicated in FIG. 6, absorbs substantially 97 percent of incident light at or below 4800 Angstrom units, transmitting 50 percent at substantially 5150 Angstrom units and substantially 95 percent at 5500 Angstrom units and above. At 5250 Angstrom units the filter 23 transmits substantially 89 percent of the incident light, and most of the light transmitted to the photomultiplier from the film 13 when clear is in a range of substantially 5200 to 5600 Angstrom units.

The relative response of the phosphor type GU at the peak blue wavelength of 4500 Angstrom units is substantially 45 percent, and at the peak green wavelength of 5250 Angstrom units is substantially 46 percent. At the red wavelength of 6100 Angstrom units the relative response of type GU phosphor is substantially 22.5 percent, and the relative response diminishes rapidly at longer wavelengths, being 10 percent at substantially 6600 Angstrom units. To give comparable outputs at the wavelengths of 4500, 5300 and 6100 Angstrom units, the photomultipliers 17, 22 and 25 are chosen to be respectively RCA types 931A, 931A and 4472.

The focal length and position of each of the cylindrical lenses 16, 21 and 24 is such that each cylindrical lens produces on the photocathode of the respective photomultiplier 17, 22 or 25 a rectangular area 27 of light which is substantially in register with the usable area of the photocathode, i.e. of the same size, shape and location, for every position of the spot of light produced on the frame 27 by the lens 11. In one constructed embodiment, each cylindrical lens has a focal length of 25 millimeters and has its plane face at a distance of substantially one inch from the respective photocathode. The frame 27 measures substantially 5 millimeters by four millimeters and the respective photocathode measures substantially 1.1 inches by 0.5 inches, being curved along 0.5 inch sides and presenting a usable area of substantially 0.1 inch by 0.9 inch.

The red filter 15 is in this case a dyed glass filter, and the blue and green filters 19, 20 and 23 are interference filters.

The distance from the frame 27 to the plane face of the lens 16 along the optical path for red light is substantially 2 inches, and to the plane faces of the lens 21 and 24 for blue and green light respectively is substantially 3 inches.

We claim:

1. An electro-optical system comprising electronic scanning means for scanning an image bearing medium with a spot of light over a limited region; optical means for producing a distribution of light over a predetermined area; and electro-optical light sensing means having a photosensitive area corresponding to said predetermined area, said optical means producing substantially the same distribution of light over said photosensitive area for all positions of the spot of light in said limited region.

2. An electro-optical system as claimed in claim 1, wherein said limited region is rectangular and said photosensitive area is rectangular, said optical means comprising a plano-cylindrical lens having the axis of its cylindrical surface lying parallel to respective sides of said region and said areas.

* * * * *